(12) United States Patent
Tian et al.

(10) Patent No.: US 12,538,053 B2
(45) Date of Patent: Jan. 27, 2026

(54) SIGNAL PROCESSING METHOD AND APPARATUS, AND COMMUNICATION SYSTEM

(71) Applicant: HUAWEI TECHNOLOGIES CO., LTD., Shenzhen (CN)

(72) Inventors: Yu Tian, Dongguan (CN); Donglin Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 18/328,156

(22) Filed: Jun. 2, 2023

(65) Prior Publication Data

US 2023/0308789 A1 Sep. 28, 2023

Related U.S. Application Data

(63) Continuation of application No. PCT/CN2021/116071, filed on Sep. 1, 2021.

(30) Foreign Application Priority Data

Dec. 7, 2020 (CN) .......................... 202011439397.6

(51) Int. Cl.
*H04Q 11/00* (2006.01)
*H04B 10/50* (2013.01)

(52) U.S. Cl.
CPC ......... *H04Q 11/0067* (2013.01); *H04B 10/50* (2013.01); *H04Q 2011/0088* (2013.01); *H04Q 2213/03* (2013.01)

(58) Field of Classification Search
CPC ..................................... H04B 10/5057–50577
See application file for complete search history.

(56) References Cited

U.S. PATENT DOCUMENTS

| 6,909,980 B2 | 6/2005 | Fernando | |
| 9,184,841 B2* | 11/2015 | Robinson | ............. H04B 10/541 |
| 10,382,131 B1* | 8/2019 | Schmidt | ............... H04B 10/588 |

(Continued)

FOREIGN PATENT DOCUMENTS

EP 3523918 B1 5/2020

OTHER PUBLICATIONS

Yue et al., "Amplitude and Time Skew Aware Equalization of 100-Gb/s PAM4 Signals at the Transmitter Side for VCSEL-Based Short Reach Optical Interconnects", State Key Laboratory of Advanced Optical Communication Systems and Networks, 2017, 2 pages.

*Primary Examiner* — Nathan M Cors
(74) *Attorney, Agent, or Firm* — Maier & Maier, PLLC

(57) ABSTRACT

A signal processing method and apparatus, and a communication system, and relates to the field of communication technologies. The method includes: a processing unit of a first device first determines a distortion parameter of an eye pattern of a first PAM-N signal transmitted by a transmitting unit in the first device, then performs anti-distortion preprocessing on a second PAM-N signal using an equalizer based on the distortion parameter, to obtain a third PAM-N signal, and controls the transmitting unit to transmit the third PAM-N signal. The distortion parameter is for reflecting a tilt status of the eye pattern, and N≥2. The equalizer is used to perform anti-distortion preprocessing on the second PAM-N signal to obtain the third PAM-N signal.

16 Claims, 10 Drawing Sheets

(56) References Cited

U.S. PATENT DOCUMENTS

| | | | |
|---|---|---|---|
| 2007/0222654 A1* | 9/2007 | Vrazel | H03M 1/1265 |
| | | | 341/144 |
| 2017/0257168 A1* | 9/2017 | Gopalakrishnan | H04L 25/00 |
| 2018/0109318 A1* | 4/2018 | Castro | H04B 10/2513 |

* cited by examiner

SIGNAL PROCESSING METHOD AND APPARATUS, AND COMMUNICATION SYSTEM

CROSS-REFERENCE TO RELATED APPLICATIONS

This application is a continuation of International Application No. PCT/CN2021/116071, filed on Sep. 1, 2021, which claims priority to Chinese Patent Application No. 202011439397.6, filed on Dec. 7, 2020. The disclosures of the aforementioned applications are hereby incorporated by reference in their entireties.

TECHNICAL FIELD

The embodiments relate to the field of communication technologies, a signal processing method and apparatus, and a communication system.

BACKGROUND

A communication system may include a plurality of communication devices, and the communication devices may transmit signals to each other for communication.

The communication device includes a transmitting unit and a receiving unit. The communication device may transmit a signal to another communication device using the transmitting unit, and receive, using the receiving unit, a signal transmitted by another communication device. There are various types of transmitting units, for example, a direct modulated laser (DML), a vertical cavity surface emitting laser (VCSEL), an electro-absorption modulated laser (EML), and a microloop component.

However, a bit error rate of the signal transmitted by the communication device is high.

SUMMARY

The embodiments provide a signal processing method and apparatus, and a communication system, to resolve a problem that a bit error rate of a signal transmitted by a communication device is high. The solutions are as follows:

According to a first aspect, an embodiment may provide a signal processing method. The method includes: A processing unit of a first device first determines a distortion parameter of an eye pattern of a first pulse amplitude modulation PAM-N signal transmitted by a transmitting unit in the first device, then sets coefficients of an equalizer based on the distortion parameter, and performs, using the equalizer, anti-distortion preprocessing on a second PAM-N signal to be transmitted by the transmitting unit, to obtain a third PAM-N signal. Finally, the processing unit controls the transmitting unit to transmit the third PAM-N signal. The distortion parameter is for reflecting a tilt status of the eye pattern, and $N \geq 2$. The equalizer is configured to perform anti-distortion preprocessing on a single-time sampled signal.

When the transmitting unit transmits a signal, the transmitted signal may be distorted due to impact of the transmitting unit. As a result, an eye pattern of the signal transmitted by the transmitting unit is tilted. In this embodiment, the distortion parameter of the eye pattern of the first PAM-N signal is obtained based on the impact of the transmitting unit on the signal. Then, anti-distortion preprocessing is performed, using the equalizer based on the distortion parameter, on the to-be-transmitted second PAM-N signal, to obtain the third PAM-N signal. Distortion of the third PAM-N signal relative to the second PAM-N signal can offset distortion of the second PAM-N signal transmitted by the transmitting unit. Therefore, the third PAM-N signal transmitted by the transmitting unit can be the same as the original second PAM-N signal, in other words, the third PAM-N signal that is distorted due to impact of the transmitting unit is the same as the original second PAM-N signal. In this way, a high signal bit error rate caused by a tilt of an eye pattern of a signal transmitted by the first device is avoided, and the bit error rate of the signal transmitted by the transmitting unit is reduced, so that the signal can meet a conformance test index, and effective communication between communication devices is ensured. In addition, in this embodiment, the processing unit processes the second PAM-N signal using the equalizer that processes a single-time sampled signal. Because the equalizer is not configured to process a multi-time sampled signal, power consumption of the processing unit is also low.

Optionally, the first device includes a digital-to-analog converter, and the digital-to-analog converter is configured to perform single-time sampling on an initial signal, to obtain the second PAM-N signal. The method further includes: Before performing, using the equalizer, anti-distortion preprocessing on the second PAM-N signal to be transmitted by the transmitting unit, the processing unit may further obtain the second PAM-N signal obtained by the digital-to-analog converter.

The digital-to-analog converter may perform single-time sampling on the initial signal, to obtain the second PAM-N signal. In this case, the second PAM-N signal is a single-time sampled signal. Optionally, the digital-to-analog converter may alternatively not perform single-time sampling on the initial signal, but perform multi-time sampling on the initial signal, to obtain the second PAM-N signal. In this case, the second PAM-N signal is a multi-time sampled signal. Because the digital-to-analog converter may perform single-time sampling on the initial signal, power consumption of the digital-to-analog converter is low. In addition, when the initial signal is a high-speed signal, the digital-to-analog converter can support single-time sampling on the high-speed signal. In this way, distortion correction for the high-speed signal can be implemented in this embodiment. The signal processing method provided in this embodiment may be applied to a communication system of a high-speed (for example, a speed of 100 gigabits per second, 200 gigabits per second, or 400 gigabits per second) signal. In addition, costs of the digital-to-analog converter that performs single-time sampling on the signal are low.

Optionally, $N>2$, each bit UI of the eye pattern includes $N-1$ eye regions, and the distortion parameter is for reflecting relative positions of the $N-1$ eye regions.

There may be a plurality of implementations for the distortion parameter. The following uses two of the implementations as examples.

In an implementation of the distortion parameter, the $N-1$ eye regions include a first eye region and $N-2$ second eye regions, and the first eye region is any eye region of the $N-1$ eye regions; and the distortion parameter includes: in a horizontal coordinate direction of the eye pattern, a distance between a center of each of the second eye regions and a center of the first eye region.

Optionally, the second PAM-N signal has N levels, the coefficients of the equalizer include N groups of coefficients that are in a one-to-one correspondence with the N levels, and a group of coefficients corresponding to an $i^{th}$ level in the N levels that are arranged in descending order include:

($a_i$, 1, $-a_i$). When i<x, $a_i=h_i$; when i=x, $a_i=h_{i-1}/y$; when i=x+1, $a_i=h_i/y$; and when i>x+1, $a_i=h_{i-1}$. 1≤i≤N, 1≤x≤N−1, y>1. The N−1 eye regions are in a one-to-one correspondence with first N−1 levels in the N levels that are arranged in descending order, and in a vertical coordinate direction of the eye pattern, an eye region corresponding to the $i^{th}$ level is located between the $i^{th}$ level and an $(i+1)^{th}$ level; an eye region corresponding to an $x^{th}$ level in the N levels that are arranged in descending order is the first eye region; and $h_i$ is a distance between a center of the eye region corresponding to the $i^{th}$ level and a center of the eye region corresponding to the $x^{th}$ level in the horizontal coordinate direction.

Optionally, y=2 or 3.

In another implementation of the distortion parameter, the N−1 eye regions include a first eye region and N−2 second eye regions, and the first eye region is any eye region of the N−1 eye regions; and the distortion parameter includes: an included angle between a horizontal coordinate axis or a vertical coordinate axis of the eye pattern and a straight line on which a center of each of the second eye regions and a center of the first eye region are located.

Optionally, regardless of which implementation is used for the distortion parameter, when N is an odd number, the first eye region is a $((N+1)/2)^{th}$ eye region in a target direction in the N−1 eye regions; or when N is an even number, the first eye region is a $(N/2)^{th}$ eye region in a target direction in the N−1 eye regions. The target direction is the vertical coordinate direction of the eye pattern, or an opposite direction of the vertical coordinate direction.

Optionally, the method further includes: Before setting the coefficients of the equalizer based on the distortion parameter, the processing unit determines that the distortion parameter meets a target condition. When the distortion parameter meets the target condition, it indicates that quality of the signal transmitted by the transmitting unit of the first device is poor, and the first device sets the coefficients of the equalizer based on the distortion parameter and performs anti-distortion preprocessing on the second PAM-N signal using the equalizer. When the distortion parameter does not meet the target condition, it indicates that the quality of the signal transmitted by the transmitting unit of the first device is good, so that the first device does not need to set the coefficients of the equalizer based on the distortion parameter and perform anti-distortion preprocessing on the second PAM-N signal using the equalizer.

Optionally, the first device includes a receiving unit, and the method further includes: When the transmitting unit is connected to the receiving unit, the processing unit obtains the first PAM-N signal that is transmitted by the transmitting unit and received by the receiving unit. Optionally, loopback calibration may be performed on the first device before leaving a factory. In this case, the transmitting unit of the first device is connected to the receiving unit. In this embodiment, the receiving unit may be used in a process of loopback calibration, the transmitting unit transmits the first PAM-N signal, and the receiving unit receives the first PAM-N signal.

Optionally, the distortion parameter may be a distortion parameter determined by the processing unit of the first device based on the eye pattern of the first PAM-N signal received by the receiving unit, or the distortion parameter may be transmitted by a second device connected to the first device. In this case, the first device includes the receiving unit, and that the distortion parameter of the eye pattern of the first PAM-N signal transmitted by the transmitting unit in the first device is determined includes: The receiving unit is used to receive the distortion parameter sent by the second device, where the first PAM-N signal is a signal transmitted by the transmitting unit to the second device.

According to a second aspect, a signal processing method is provided. The method includes: A second device first receives a first pulse amplitude modulation PAM-N signal transmitted by a first device, then determines a distortion parameter of an eye pattern of the first PAM-N signal, and subsequently sends the distortion parameter to the first device, so that the first device processes a to-be-transmitted signal based on the distortion parameter.

According to a third aspect, a signal processing apparatus is provided. The signal processing apparatus includes:

a first determining module, configured to determine a distortion parameter of an eye pattern of a first pulse amplitude modulation PAM-N signal transmitted by a transmitting unit in a first device, where the distortion parameter is for reflecting a tilt status of the eye pattern, and N≥2;

a setting module, configured to set coefficients of an equalizer based on the distortion parameter, where the equalizer is configured to perform anti-distortion preprocessing on a single-time sampled signal;

an anti-distortion preprocessing module, configured to perform, using the equalizer, anti-distortion preprocessing on a second PAM-N signal to be transmitted by the transmitting unit, to obtain a third PAM-N signal, where the second PAM-N signal is a single-time sampled signal; and a control module, configured to control the transmitting unit to transmit the third PAM-N signal.

Optionally, the first device includes a digital-to-analog converter, and the digital-to-analog converter is configured to perform single-time sampling on an initial signal, to obtain the second PAM-N signal. The signal processing apparatus further includes a first obtaining module (not shown in FIG. 13), configured to, before the equalizer is used to perform anti-distortion preprocessing on the second PAM-N signal to be transmitted by the transmitting unit, obtain the second PAM-N signal obtained by the digital-to-analog converter.

Optionally, N>2, each bit UI of the eye pattern includes N−1 eye regions, and the distortion parameter is for reflecting relative positions of the N−1 eye regions.

Optionally, the N−1 eye regions include a first eye region and N−2 second eye regions, and the first eye region is any eye region of the N−1 eye regions; and the distortion parameter includes: in a horizontal coordinate direction of the eye pattern, a distance between a center of each of the second eye regions and a center of the first eye region.

Optionally, the second PAM-N signal has N levels, the coefficients of the equalizer include N groups of coefficients that are in a one-to-one correspondence with the N levels, and a group of coefficients corresponding to an $i^{th}$ level in the N levels that are arranged in descending order include: ($a_i$, 1, $-a_i$). When i<x, $a_i=h_i$; when i=x, $a_i=h_{i-1}/y$; when i=x+1, $a_i=h_i/y$; and when i>x+1, $a_i=h_{i-1}$. 1≤i≤N, 1≤x≤N−1, y>1. The N−1 eye regions are in a one-to-one correspondence with first N−1 levels in the N levels that are arranged in descending order, and in a vertical coordinate direction of the eye pattern, an eye region corresponding to the $i^{th}$ level is located between the $i^{th}$ level and an $(i+1)^{th}$ level; an eye region corresponding to an $x^{th}$ level in the N levels that are arranged in descending order is the first eye region; and $h_i$ is a distance between a center of the eye region corresponding to the $i^{th}$ level and a center of the ye region corresponding to the $x^{th}$ level in the horizontal coordinate direction.

Optionally, y=2 or 3.

Optionally, the N−1 eye regions include a first eye region and N−2 second eye regions, and the first eye region is any eye region of the N−1 eye regions; and the distortion parameter includes: an included angle between a horizontal coordinate axis or a vertical coordinate axis of the eye pattern and a straight line on which a center of each of the second eye regions and a center of the first eye region are located.

Optionally, when N is an odd number, the first eye region is a $((N+1)/2)^{th}$ eye region in a target direction in the N−1 eye regions; or when N is an even number, the first eye region is a $(N/2)^{th}$ eye region in a target direction in the N−1 eye regions. The target direction is the vertical coordinate direction of the eye pattern, or an opposite direction of the vertical coordinate direction.

Optionally, the signal processing apparatus further includes a second determining module, configured to, before the coefficients of the equalizer are set based on the distortion parameter, determine that the distortion parameter meets a target condition.

Optionally, the first device includes a receiving unit, and the signal processing apparatus further includes a second obtaining module, configured to, when the transmitting unit is connected to the receiving unit, obtain the first PAM-N signal that is transmitted by the transmitting unit and received by the receiving unit.

Optionally, the first device includes the receiving unit, and the first determining module is configured to, using the receiving unit, receive the distortion parameter sent by a second device, where the first PAM-N signal is a signal transmitted by the transmitting unit to the second device.

According to a fourth aspect, a chip is provided. The chip includes a programmable logic circuit and/or program instructions, and when run, the chip is configured to implement any signal processing method provided in the first aspect.

According to a fifth aspect, a communication device is provided. The communication device includes a transmitting unit and a processing unit.

The transmitting unit is configured to transmit a first pulse amplitude modulation PAM-N signal, and N≥2.

The processing unit is configured to: determine a distortion parameter of an eye pattern of the first PAM-N signal, where the distortion parameter is for reflecting a tilt status of the eye pattern; set coefficients of an equalizer based on the distortion parameter, where the equalizer is configured to perform anti-distortion preprocessing on a single-time sampled signal; perform, using the equalizer, anti-distortion preprocessing on a second PAM-N signal to be transmitted by the transmitting unit, to obtain a third PAM-N signal; and control the transmitting unit to transmit the third PAM-N signal.

The transmitting unit is further configured to transmit the third PAM-N signal.

Optionally, the communication device further includes a digital-to-analog converter, and the digital-to-analog converter is configured to perform single-time sampling on an initial signal to obtain the second PAM-N signal.

Optionally, N>2, each bit UI of the eye pattern includes N−1 eye regions, and the distortion parameter is for reflecting relative positions of the N−1 eye regions.

Optionally, the N−1 eye regions include a first eye region and N−2 second eye regions, and the first eye region is any eye region of the N−1 eye regions; and the distortion parameter includes: in a horizontal coordinate direction of the eye pattern, a distance between a center of each of the second eye regions and a center of the first eye region.

Optionally, the second PAM-N signal has N levels, the coefficients of the equalizer include N groups of coefficients that are in a one-to-one correspondence with the N levels, and a group of coefficients corresponding to an $i^{th}$ level in the N levels that are arranged in descending order include: $(a_i, 1, -a_i)$. When i<x, $a_i = h_i$; when i=x, $a_i = h_{i-1}/y$; when i=x+1, $a_i = h_i/y$; and when i>x+1, $a_i = h_{i-1}$. 1≤i≤N, 1≤x≤N−1, y>1. The N−1 eye regions are in a one-to-one correspondence with first N−1 levels in the N levels that are arranged in descending order, and in a vertical coordinate direction of the eye pattern, an eye region corresponding to the $i^{th}$ level is located between the $i^{th}$ level and an $(i+1)^{th}$ level; an eye region corresponding to an $x^{th}$ level in the N levels that are arranged in descending order is the first eye region; and $h_i$ is a distance between a center of the eye region corresponding to the $i^{th}$ level and a center of the eye region corresponding to the $x^{th}$ level in the horizontal coordinate direction.

Optionally, y=2 or 3.

Optionally, the N−1 eye regions include a first eye region and N−2 second eye regions, and the first eye region is any eye region of the N−1 eye regions; and the distortion parameter includes: an included angle between a horizontal coordinate axis or a vertical coordinate axis of the eye pattern and a straight line on which a center of each of the second eye regions and a center of the first eye region are located.

Optionally, when N is an odd number, the first eye region is a $((N+1)/2)^{th}$ eye region in a target direction in the N−1 eye regions; or when N is an even number, the first eye region is a $(N/2)^{th}$ eye region in a target direction in the N−1 eye regions. The target direction is the vertical coordinate direction of the eye pattern, or an opposite direction of the vertical coordinate direction.

Optionally, the processing unit is configured to, before setting the coefficients of the equalizer based on the distortion parameter, determine that the distortion parameter meets a target condition.

Optionally, the communication device further includes a receiving unit. The receiving unit is configured to, when connected to the transmitting unit, receive the first PAM-N signal transmitted by the transmitting unit. The processing unit is further configured to obtain the first PAM-N signal received by the receiving unit.

Optionally, the communication device further includes the receiving unit. The transmitting unit is configured to transmit the first PAM-N signal to a second device. The receiving unit is configured to receive the distortion parameter transmitted by the second device. The processing unit is configured to obtain the distortion parameter received by the receiving unit.

According to a sixth aspect, a communication device is provided. The communication device includes a transmitting unit, a receiving unit, and a processing unit.

The receiving unit is configured to receive a first pulse amplitude modulation PAM-N signal transmitted by a first device.

The processing unit is configured to determine a distortion parameter of an eye pattern of the first PAM-N signal.

The transmitting unit is configured to transmit the distortion parameter to the first device, so that the first device processes a to-be-transmitted signal based on the distortion parameter.

According to a seventh aspect, a communication system is provided. The communication system includes a first device and a second device that are connected to each other, and the first device is any communication device provided in the fifth aspect.

Optionally, the second device is any communication device provided in the sixth aspect.

According to an eighth aspect, a computer-readable storage medium is provided. The computer-readable storage medium stores instructions, and when the instructions are run on a computer, the computer is enabled to perform any signal processing method provided in the first aspect or the second aspect.

According to a ninth aspect, a computer program product is provided. When the computer program product is run on a computer, the computer is enabled to perform any signal processing method provided in the first aspect or the second aspect.

For beneficial effects of the second aspect to the ninth aspect, refer to corresponding descriptions in the first aspect. Details are not described herein again.

DETAILED DESCRIPTION OF THE EMBODIMENTS

The following further describes the embodiments in detail with reference to the accompanying drawings.

Figure 1:
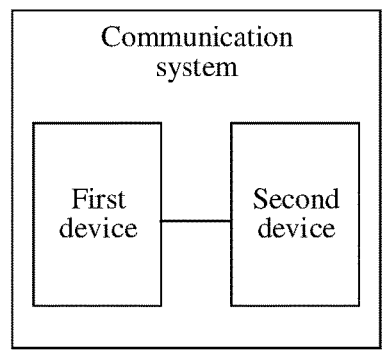
FIG. 1 is a schematic diagram of a structure of a communication system according to an embodiment.

FIG. 1 is a schematic diagram of a structure of a communication system according to an embodiment. As shown in FIG. 1, the communication system may include a plurality of communication devices (for example, a first device 01 and a second device 02 in FIG. 1). It should be noted that, a quantity of the communication devices in the communication system is not limited in this embodiment, and FIG. 1 shows only two communication devices in the communication system.

The communication system provided in this embodiment may be a communication system based on any communication technology, for example, the $4^{th}$ generation mobile communication technology (4G) communication system, the $5^{th}$ generation mobile communication technology (5G) communication system, the $6^{th}$ generation mobile communication technology (6G) communication system, or a communication system of another communication standard.

Figure 2:
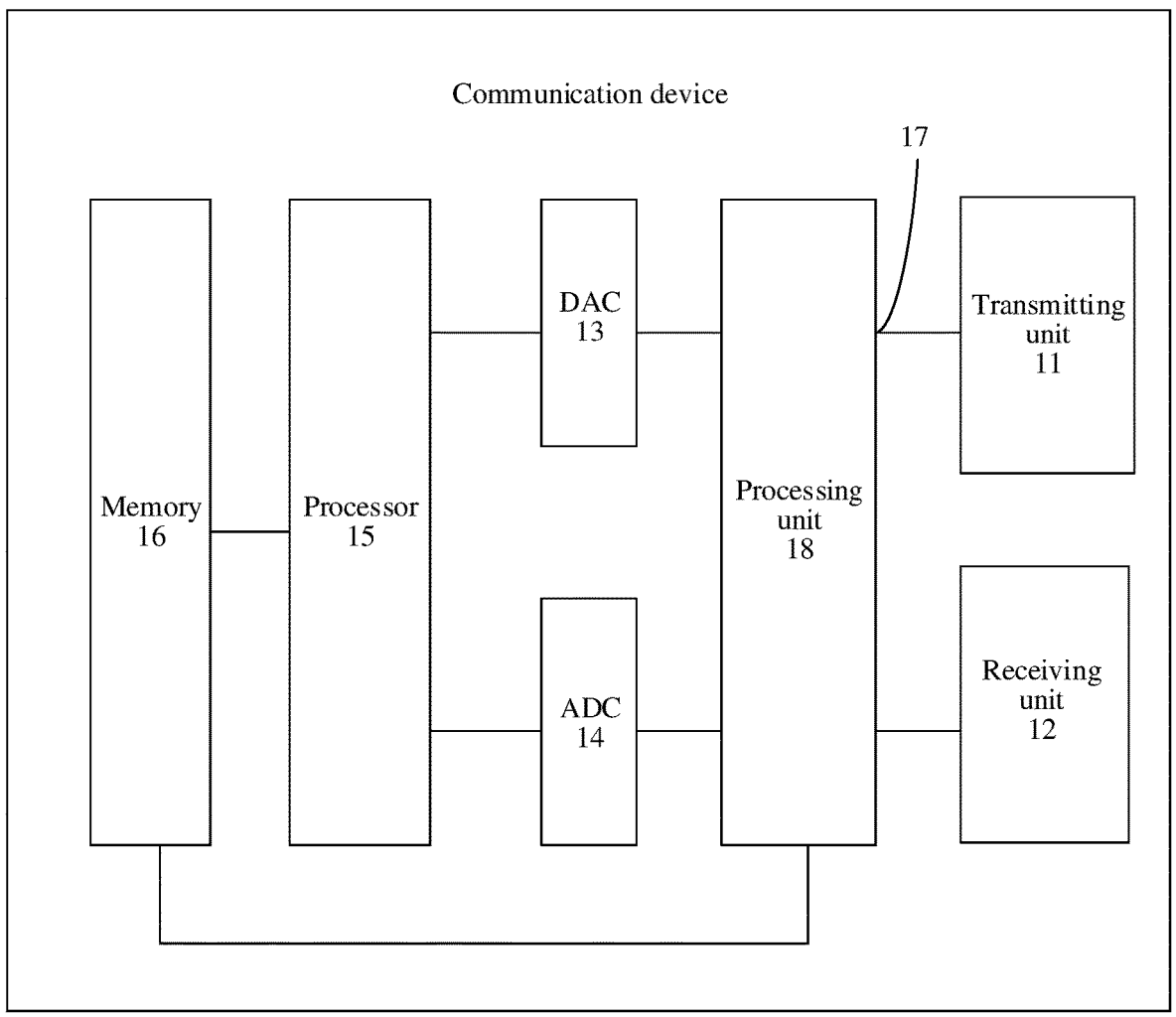
FIG. 2 is a schematic diagram of a structure of a communication device according to an embodiment.

The communication devices in the communication system may transmit signals to each other for communication. For example, FIG. 2 is a schematic diagram of a structure of a communication device according to an embodiment. The communication device may be any communication device in the communication system. As shown in FIG. 2, the communication device may include a transmitting unit 11 and a receiving unit 12. The transmitting unit may also be referred to as a transmitter optical subassembly (TOSA), and the receiving unit may also be referred to as a receiver optical subassembly (ROSA). The communication device may transmit a signal to another communication device using the transmitting unit 11, and receive, using the receiving unit 12, a signal transmitted by another communication device. The communication device may further include a digital-to-analog converter (DAC) 13, an analog-to-digital converter (ADC) 14, and a processor 15. The DAC 13 is connected to the transmitting unit 11 and the processor 15, and the ADC 14 is connected to the receiving unit 12 and the processor 15.

In the communication device provided in this embodiment, the processor 15 is configured to generate a digital signal and transmit the digital signal to the DAC 13. The DAC 13 is configured to convert the received digital signal into an analog signal and transmit the analog signal to the transmitting unit 11. The transmitting unit 11 is configured to convert the analog signal into an optical signal and transmit the optical signal. The receiving unit 12 is configured to receive the optical signal, convert the received optical signal into an analog signal, and transmit the analog signal to the ADC 14. The ADC 14 is configured to convert the analog signal into a digital signal and transmit the digital signal to the processor 15. The processor 15 is configured to process the received digital signal.

Optionally, the communication device shown in FIG. 2 may further include other parts, for example, a memory 16 and a bus 17. All parts of the communication device except the bus 17 may be communicatively connected to each other through the bus 17.

There may be various types of transmitting units in the communication device, such as a DML, a VCSEL, an EML, and a microloop component. However, signals transmitted by these transmitting units all have a problem of signal eye pattern distortion. As a result, quality of the signals transmission is low (for example, bit error rates (BER) of the signals are high), and the signals cannot meet a conformance test index (for example, a transmitter dispersion eye closure quaternary (TDECQ)), and effective communication between the communication devices is affected. For the DML and the VCSEL, because response speeds of the DML and the VCSEL are correlated with signal voltage amplitudes, signal eye pattern distortion exists in both signals transmitted by the DML and the VCSEL. For the microloop component, because the microloop component has a non-linear effect, the signal eye pattern distortion also exists in a signal modulated by the microloop component. For the EML, under a combined effect of chirping and fiber dispersion of the EML, the signal eye pattern distortion also exists after a signal transmitted by the EML is transmitted in a fiber.

Figure 3:
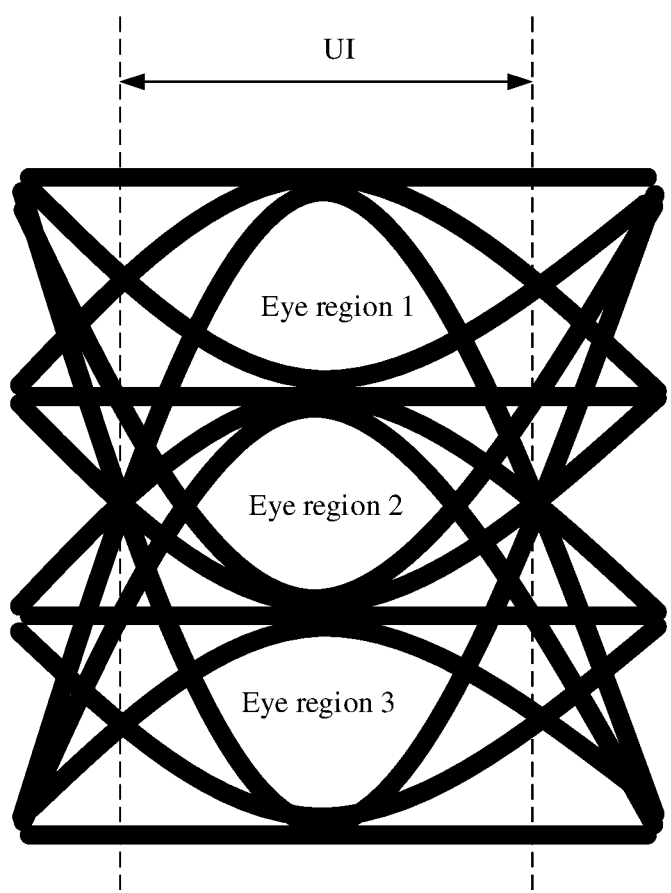
FIG. 3 is an eye pattern of a PAM-4 signal according to an embodiment.

The signal mentioned in the foregoing embodiment may be a pulse amplitude modulation (PAM)-N signal, and N≥2, for example, a PAM-2 signal, a PAM-4 signal, or a PAM-5 signal. An eye pattern of the PAM-N signal may include a plurality of bits (UI), and each UI includes N−1 eye regions. For example, FIG. 3 is an eye pattern of a PAM-4 signal according to an embodiment. Each UI in the eye pattern of the PAM-4 signal includes three eye regions (which are respectively eye regions 1, 2, and 3). The eye pattern of the signal can reflect quality of the signal. When the eye pattern of the signal is not distorted (such as the eye pattern shown in FIG. 3), it indicates that the quality of the signal is good and a bit error rate of the signal is low. When the eye pattern of the signal is distorted, it indicates that the quality of the signal is poor, and the bit error rate of the signal is high. In this embodiment, distortion of the eye pattern of the signal transmitted by the transmitting unit is that the eye pattern is tilted.

Figure 4:
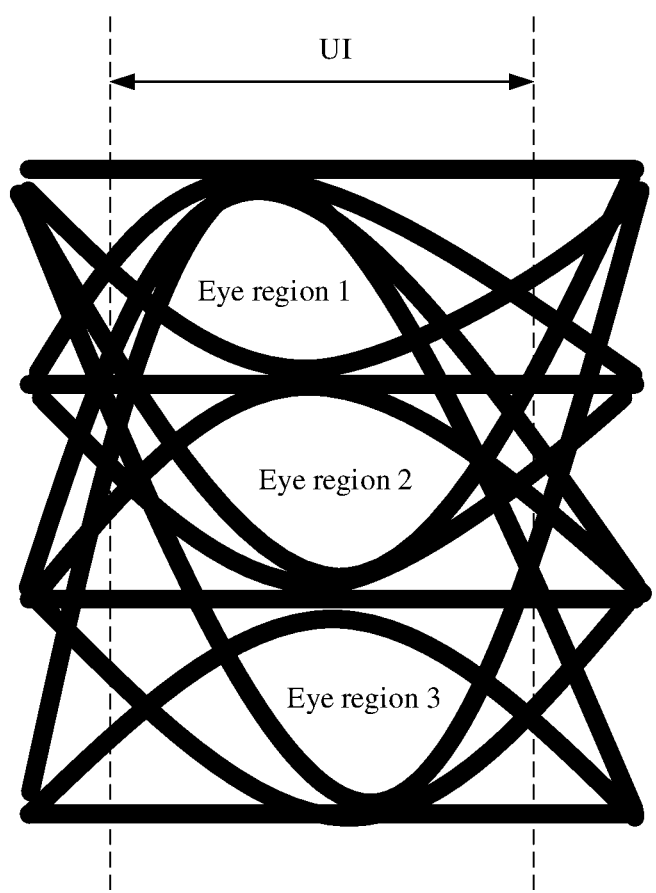
FIG. 4 is a schematic diagram of eye pattern distortion of a PAM-4 signal according to an embodiment.

For example, when N=4, a schematic diagram of eye pattern distortion of a PAM-4 signal may be shown in FIG. 4. From a comparison between FIG. 3 and FIG. 4 that, in the eye pattern shown in FIG. 3, centers of the three eye regions in each UI are collinear, and a connection line of the centers is in parallel with a vertical coordinate axis of the eye pattern, however, in the eye pattern shown in FIG. 4, a connection line of centers of three eye regions in each UI is not in parallel with a vertical coordinate axis of the eye pattern (for example, the connection line of the centers of the three eye regions in FIG. 4 is tilted to the vertical coordinate axis, or a connection line of centers of the N−1 eye regions is not a straight line). Optionally, a horizontal coordinate in the eye pattern may be represented as a timeline in a unit of second, millisecond, or the like, and a vertical coordinate in the eye pattern may be represented as a level in a unit of volt, millivolt, or the like.

Figure 5:
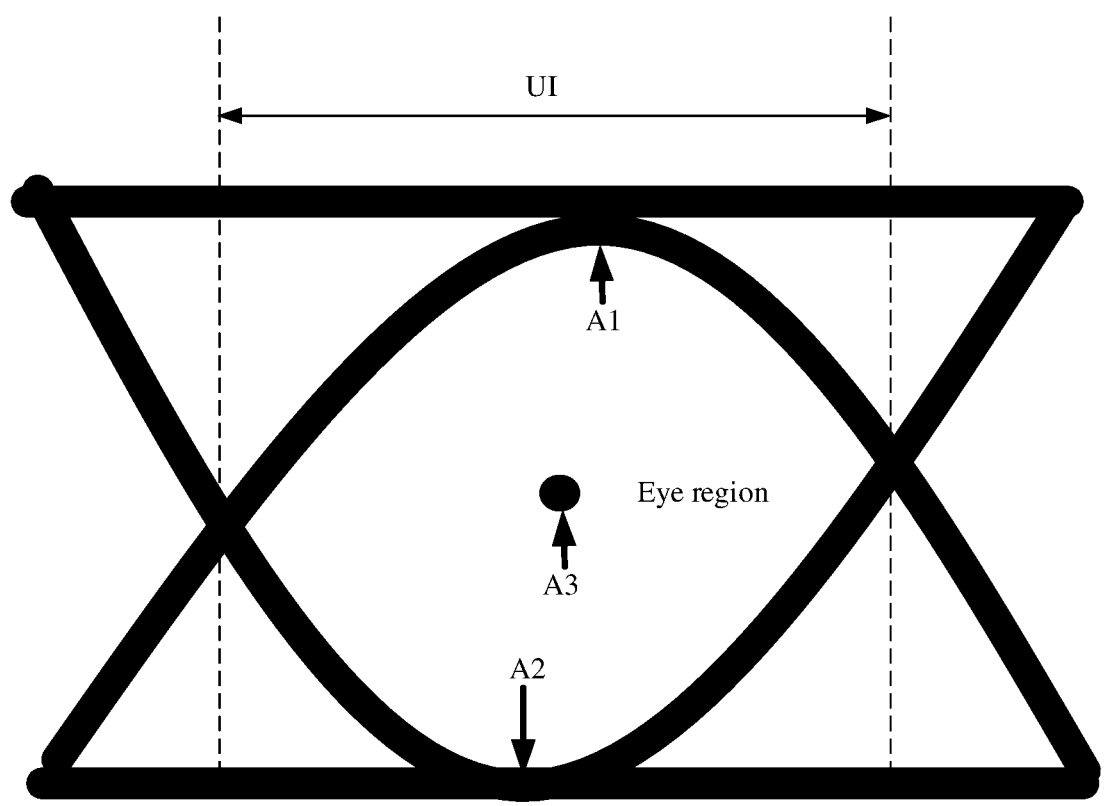
FIG. 5 is a schematic diagram of eye pattern distortion of a PAM-2 signal according to an embodiment.

For another example, when N=2, an eye pattern of the PAM-2 signal includes only one eye region. That the eye pattern is tilted may be: Two maximum boundary points of the eye region are tilted relative to a center of the eye region. The two maximum boundary points include: a boundary point that is farthest away from the center of the eye region in a vertical coordinate direction of the eye pattern, and a boundary point that is farthest away from the center of the eye region in an opposite direction of the vertical coordinate direction. For example, a schematic diagram of eye pattern distortion of the PAM-2 signal may be shown in FIG. 5. In a vertical coordinate direction of the eye pattern, two maximum boundary points (a point A1 and a point A2) of an eye region are tilted relative to a center (A3) of the eye region.

The embodiments may provide a signal processing method. According to the signal processing method, the problem of a high signal bit error rate caused by a tilt of the eye pattern of the signal transmitted by the communication device can be resolved. This reduces the bit error rate of the signal transmitted by the communication device and improves quality of the signal.

Figure 6:
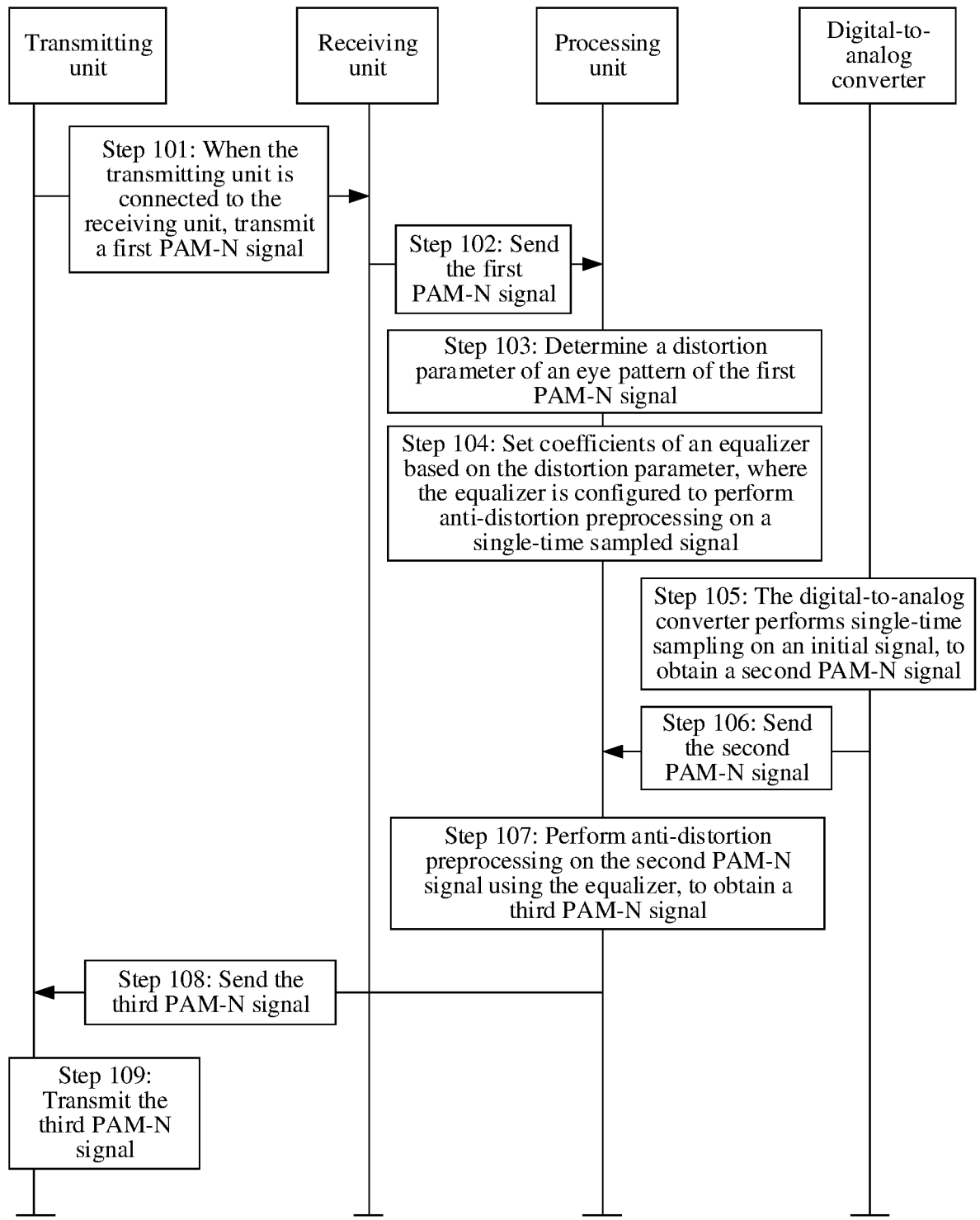
FIG. 6 is a flowchart of a signal processing method according to an embodiment.

For example, FIG. 6 is a flowchart of a signal processing method according to an embodiment. The signal processing method may be applied to a first device, and the first device may be any communication device in the communication system provided in embodiments. It should be noted that, as shown in FIG. 2, the communication device further includes a processing unit 18, and the processing unit 18 is connected to a transmitting unit 11. Optionally, the processing unit 18 may be further connected to a receiving unit 12 and a DAC 13, and the processing unit 18 may be further connected to a memory 16. The processing unit 18 may be a unit in any form. For example, the processing unit 18 may be a digital signal process (DSP) chip, or a processor. In addition, the processing unit 18 in the communication device and a processor 15 may be independent of each other. The processing unit 18 and the processor 15 may alternatively be integrated together. In FIG. 2, an example in which the processor 15 and the processing unit 18 are independent of each other is used.

As shown in FIG. 6, the signal processing method includes:

Step 101: When a transmitting unit is connected to a receiving unit, the transmitting unit transmits a first PAM-N signal to the receiving unit.

In an embodiment shown in FIG. 6, the transmitting unit in the first device may be connected to the receiving unit, and the transmitting unit transmits the first PAM-N signal, so that the receiving unit can receive the first PAM-N signal transmitted by the transmitting unit.

Optionally, loopback calibration may be performed on the first device before leaving a factory. In this case, the transmitting unit of the first device is connected to the receiving unit. In this embodiment, the receiving unit may be used in a process of loopback calibration, the transmitting unit transmits the first PAM-N signal, and the receiving unit receives the first PAM-N signal.

Step 102: The receiving unit sends the first PAM-N signal to a processing unit.

The processing unit is connected to the receiving unit. After the receiving unit receives the first PAM-N signal, the receiving unit may transmit the first PAM-N signal to the processing unit, so that the processing unit can receive the first PAM-N signal.

Step 103: The processing unit determines a distortion parameter of an eye pattern of the first PAM-N signal.

After obtaining the first PAM-N signal, the processing unit may generate the eye pattern of the first PAM-N signal, to determine the distortion parameter of the eye pattern. The distortion parameter of the eye pattern may be for reflecting a tilt status of the eye pattern. For example, each UI of the eye pattern includes N−1 eye regions. When N>2, the distortion parameter is for reflecting relative positions of the N−1 eye regions. When N=2, the distortion parameter is for reflecting relative positions of two maximum boundary points of the eye region and a center of the eye region.

There may be a plurality of implementations for the distortion parameter of the eye pattern. The following uses two of the implementations as examples for description.

According to one aspect, when N>2, the distortion parameter includes: in a horizontal coordinate direction of the eye pattern, a distance between a center of each second eye region and a center of a first eye region.

It should be noted that, the N−1 eye regions in the eye pattern include: a first eye region and N−2 second eye regions, and the first eye region is any eye region of the N−1 eye regions. Optionally, when N is an odd number, the first eye region is a $((N+1)/2)^{th}$ eye region in a target direction in the N−1 eye regions; or when N is an even number, the first eye region is a $(N/2)^{th}$ eye region in a target direction in the N−1 eye regions. The target direction is a vertical coordinate direction of the eye pattern, or an opposite direction of the vertical coordinate direction of the eye pattern.

Figure 7:
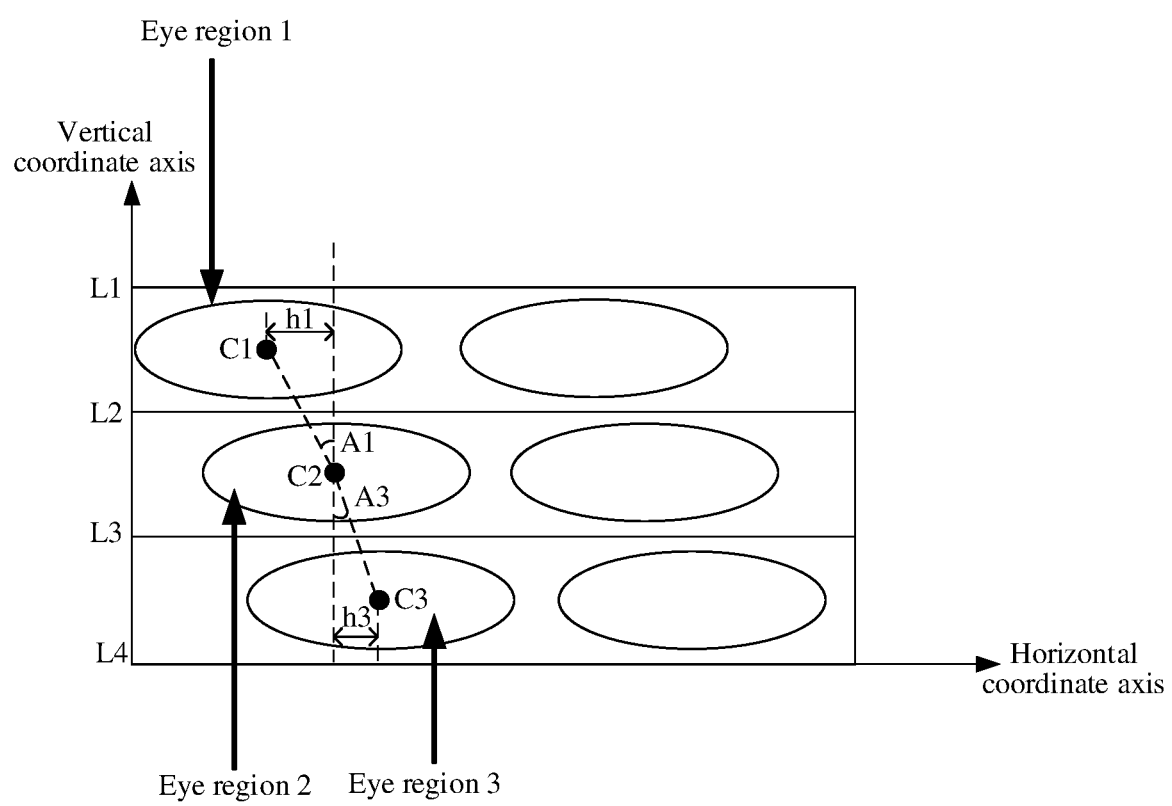
FIG. 7 is another schematic diagram of eye pattern distortion of a PAM-4 signal according to an embodiment.

For example, when N=4, a schematic diagram of eye pattern distortion of a PAM-4 signal may be shown in FIG. 7. Each UI in the eye pattern includes three eye regions, which are respectively eye regions 1, 2, and 3. The three eye regions are sequentially arranged in an opposite direction of a vertical coordinate direction, the eye region 2 is the first eye region, and both the eye regions 1 and 3 are the second eye regions. In this case, the distortion parameter of the eye pattern includes: in a horizontal coordinate direction of the eye pattern, a distance h1 between a center C1 of the eye region 1 and a center C2 of the eye region 2, and a distance h3 between a center C3 of the eye region 3 and the center C2 of the eye region 2.

Figure 8:
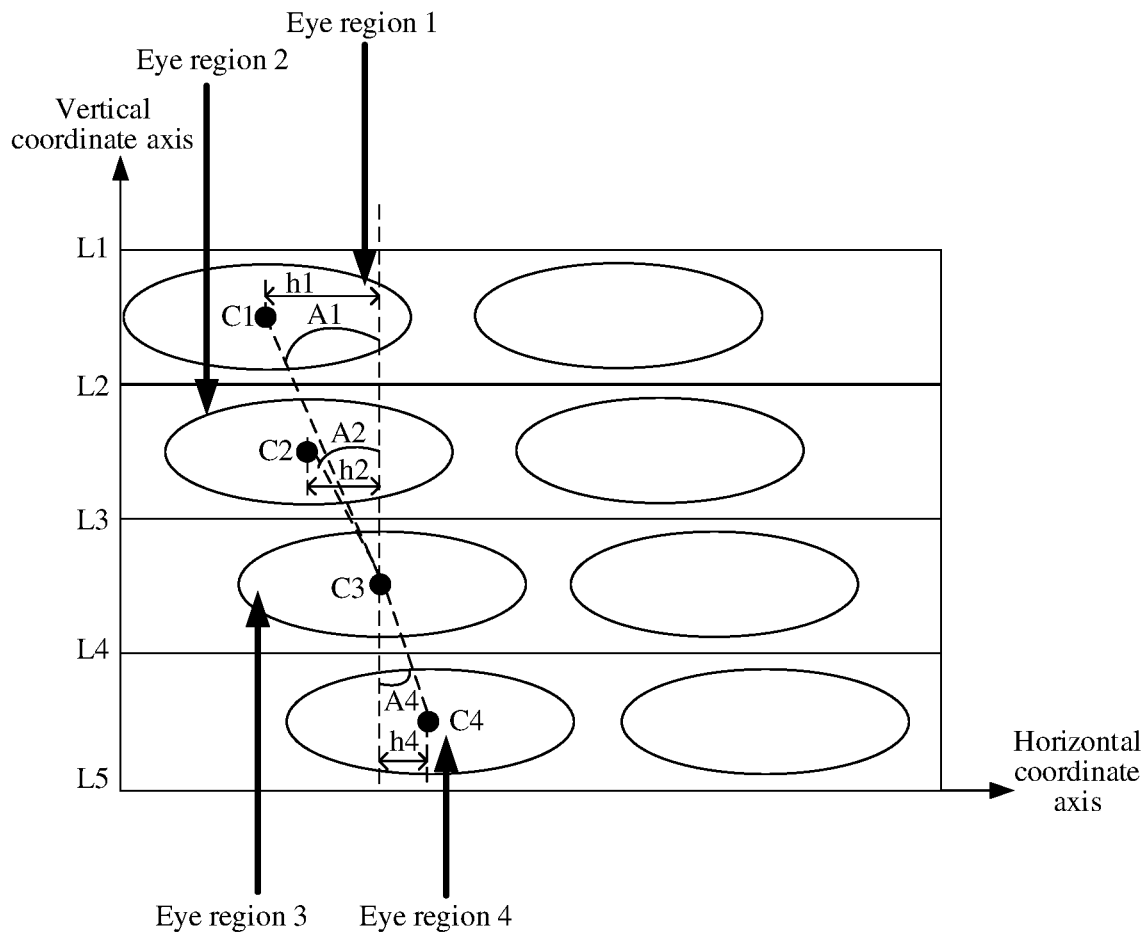
FIG. 8 is another schematic diagram of eye pattern distortion of a PAM-5 signal according to an embodiment.

For another example, when N=5, a schematic diagram of eye pattern distortion of a PAM-5 signal may be shown in FIG. 8. Each UI in the eye pattern includes four eye regions, which are respectively eye regions 1, 2, 3, and 4. The four eye regions are sequentially arranged in an opposite direction of a vertical coordinate direction, the eye region 3 is the first eye region, and the eye regions 1, 2, 4 are all the second eye regions. In this case, the distortion parameter of the eye pattern includes: in a horizontal coordinate direction of the eye pattern, a distance h1 between a center C1 of the eye region 1 and a center C3 of the eye region 3, a distance h2 between a center C2 of the eye region 2 and the center C3 of the eye region 3, and a distance h4 between a center C4 of the eye region 4 and the center C3 of the eye region 3.

According to another aspect, when N>2, the distortion parameter includes: an included angle between a horizontal coordinate axis or a vertical coordinate axis of the eye pattern and a straight line on which a center of each second eye region and a center of the first eye region are located.

For example, still refer to FIG. 7, the distortion parameter of the eye pattern includes: an included angle A1 and an included angle A3. The included angle A1 is an included angle between a vertical coordinate axis of the eye pattern and a straight line on which the center C1 of the eye region 1 and the center C2 of the eye region 2 are located, and the included angle A3 is an included angle between the vertical coordinate axis of the eye pattern and a straight line on which the center C3 of the eye region 3 and the center C2 of the eye region 2 are located.

For example, still refer to FIG. 8, the distortion parameter of the eye pattern includes: an included angle A1, an included angle A2, and an included angle A4. The included angle A1 is an included angle between a vertical coordinate axis of the eye pattern and a straight line on which the center C1 of the eye region 1 and the center C3 of the eye region 3 are located, the included angle A2 is an included angle between the vertical coordinate axis of the eye pattern and a straight line on which the center C2 of the eye region 2 and the center C3 of the eye region 3 are located, and the included angle A4 is an included angle between the vertical coordinate axis of the eye pattern and a straight line on which the center C4 of the eye region 4 and the center C3 of the eye region 3 are located.

Both two manners of the distortion parameter may reflect a relative position of each second eye region and the first eye region and may further reflect the relative positions of the N−1 eye regions. The distortion parameter may further reflect the relative positions of these eye regions in another manner. This is not limited in this embodiment.

For an implementation of the distortion parameter when N=2, refer to the implementation of the distortion parameter when N>2.

For example, when N=2, the eye pattern includes one eye region in one UI, and the eye region includes two maximum boundary points in the vertical coordinate direction.

Figure 9:
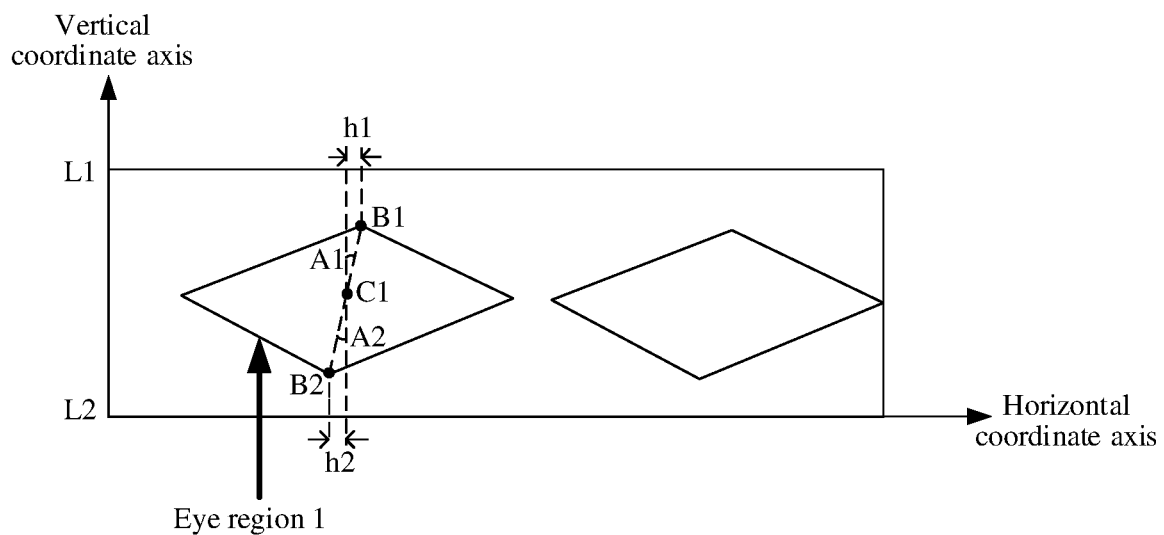
FIG. 9 is a schematic diagram of eye pattern distortion of a PAM-2 signal according to an embodiment.

According to one aspect, the distortion parameter may include: in the horizontal coordinate direction of the eye pattern, a distance between each maximum boundary point of the eye region and a center of the eye region. For example, when N=2, a schematic diagram of eye pattern distortion of a PAM-2 signal may be shown in FIG. 9. Each UI in the eye pattern includes an eye region 1, and two maximum boundary points of the eye region 1 in a vertical coordinate direction are respectively a point B1 and a point B2. The distortion parameter of the eye pattern includes: in a horizontal coordinate direction of the eye pattern, a distance h1 between the maximum boundary point B1 and a center C1 of the eye region 1, and a distance h2 between the maximum boundary point B2 and the center C1 of the eye region 1.

According to another aspect, the distortion parameter may include: an included angle between the vertical coordinate axis and a straight line on which each maximum boundary point of the eye region and the center of the eye region are located. For example, still refer to FIG. 9, the distortion parameter of the eye pattern includes: an included angle A1 between a vertical coordinate axis and a straight line on which the maximum boundary point B1 and the center C1 of the eye region 1 are located, and an included angle A2 between the vertical coordinate axis and a straight line on which the maximum boundary point B2 and the center C1 of the eye region 1 are located.

Step 104: The processing unit sets coefficients of an equalizer based on the distortion parameter, where the equalizer is configured to perform anti-distortion preprocessing on a single-time sampled signal.

After obtaining the distortion parameter for reflecting the tilt status of the first PAM-N signal, the processing unit may set the coefficients of the equalizer based on the distortion parameter, to perform anti-distortion preprocessing on the signal using the equalizer in a subsequent step. the coefficients of the equalizer may be related to the distortion parameter and an anti-distortion preprocessing function. Therefore, the processing unit may determine coefficients of the equalizer correspondingly based on the distortion parameter in step 103 and the anti-distortion preprocessing function.

The coefficients of the equalizer may include N groups of coefficients. A second PAM-N signal has N levels, and the N groups of coefficients may be in a one-to-one correspondence with the N levels. A group of coefficients corresponding to an $i^{th}$ level in the N levels that are arranged in descending order include: $(a_i, 1, -a_i)$. For example, the distortion parameter includes: in the horizontal coordinate direction of the eye pattern, the distance between the center of each second eye region and the center of the first eye region. When $i<x$, $a_i=h_i$. When $i=x$, $a_i=h_{i-1}/y$; when $i=x+1$, $a_i=h_i/y$; or when $i>x+1$, $a_i=h_{i-1}$. $1 \le i \le N$, $1 \le x \le N-1$, and $y>1$. A value of $h_i$ is a distance between a center of an eye region corresponding to the $i^{th}$ level and a center of the eye region corresponding to the $x^{th}$ level in the horizontal coordinate direction. It should be noted that, the N−1 eye regions in the eye pattern are in a one-to-one correspondence with first N−1 levels in the N levels that are arranged in descending order. In the vertical coordinate direction of the eye pattern, the eye region corresponding to the $i^{th}$ level is located between the $i^{th}$ level and an $(i+1)^{th}$ level, and an eye region corresponding to an $x^{th}$ level in the N levels that are arranged in descending order is the first eye region.

Optionally, y may be any integer greater than 1, for example, 2 or 3.

The eye pattern of the PAM-4 signal shown in FIG. 7 is used as an example. The PAM-4 signal has four levels, which are respectively L1, 2, 3, and 4 in FIG. 7, where L1=3 V (volt), L2=1 V, L3=−1 V, and L4=−3 V. The four levels are arranged in descending order in the opposite direction of the vertical coordinate direction. The processing unit needs to determine four groups of coefficients of the equalizer, and the four groups of coefficients are in a one-to-one correspondence with the four levels. The three eye regions in the eye pattern are in a one-to-one correspondence with first three levels in the four levels that are arranged in descending order. For example, the eye region 1 corresponds to the level L1, the eye region 2 corresponds to the level L2, and the eye region 3 corresponds to the level L3. In the vertical coordinate direction of the eye pattern, the eye region 1 corresponding to the level L1 is located between the level L1 and the level L2, the eye region 2 corresponding to the level L2 is located between the level L2 and the level L3, and the eye region 3 corresponding to the level L3 is located between the level L3 and the level L4.

Assuming that the eye region 2 corresponding to a second level (level L2) in the four levels that are arranged in descending order is the first eye region, x=2, and y=2, the distortion parameter of the eye pattern includes: the distance h1 and the distance h3. Because 1<x, $a_1=h_1$; because 2=x, $a_2=h_{2-1}/2=h_1/2$; because 3=x+1, $a_3=h_3/2$; and because 4>x+1, $a_4=h_{4-1}=h_3$.

A group of coefficients corresponding to a first level (level L1) in the four levels that are arranged in descending order include: $(a_1, 1, -a_1)=(h_1, 1, -h_1)$, a group of coefficients corresponding to the second level (level L2) in the four levels that are arranged in descending order include: $(a_2, 1, -a_2)=(h_1/2, 1, -h_1/2)$, and a group of coefficients corresponding to a third level (level L3) in the four levels that are arranged in descending order include: $(a_3, 1, -a_3)=(h_3/2, 1, -h_3/2)$, a group of coefficients corresponding to a fourth level (level L4) in the four levels that are arranged in descending order include: $(a_4, 1, -a_4)=(h_3, 1, -h_3)$.

Step 105: The digital-to-analog converter performs single-time sampling on an initial signal, to obtain the second PAM-N signal.

Refer to FIG. 2, the initial signal may be a signal generated by the processor 15, and the initial signal may be transmitted by the processor 15 to the DAC (digital-to-analog converter) 13. The DAC 13 may perform single-time sampling on the initial signal, to obtain the second PAM-N signal. In this case, the second PAM-N signal is a single-time sampled signal.

Optionally, the DAC 13 may not perform single-time sampling on the initial signal, but perform multi-time sampling on the initial signal, to obtain the second PAM-N signal. In this case, the second PAM-N signal is a multi-time sampled signal.

Step 106: The digital-to-analog converter sends the second PAM-N signal to the processing unit.

After obtaining the second PAM-N signal, the digital-to-analog converter may transmit the second PAM-N signal to the processing unit, so that the processing unit obtains the second PAM-N signal and performs anti-distortion preprocessing on the second PAM-N signal in a subsequent step.

Step 107: The processing unit performs anti-distortion preprocessing on the second PAM-N signal using the equalizer, to obtain a third PAM-N signal.

The equalizer is configured to perform anti-distortion preprocessing on a single-time sampled signal. When the second PAM-N signal obtained by the digital-to-analog converter is a single-time sampled signal, the equalizer may directly perform anti-distortion preprocessing on the second PAM-N signal. When the second PAM-N signal obtained by the digital-to-analog converter is a multi-time sampled signal, the processing unit may first obtain a single-time sampled signal from the multi-time sampled signal, and then perform anti-distortion preprocessing on the obtained single-time sampled signal.

Because the processing unit sets the coefficients of the equalizer based on the distortion parameter in step 104, the equalizer can perform anti-distortion preprocessing on the single-time sampled signal. Therefore, in step 107, the processing unit may directly perform, using the equalizer, anti-distortion preprocessing on the second PAM-N signal (or the single-time sampled signal of the second PAM-N signal), to obtain the third PAM-N signal.

Optionally, the equalizer used in this embodiment may be a finite impulse response (FIR) equalizer.

Step 108: The processing unit sends the third PAM-N signal to the transmitting unit.

Step 109: The transmitting unit transmits the third PAM-N signal.

After obtaining the third PAM-N signal, the processing unit may transmit the third PAM-N signal to the transmitting unit, so that the transmitting unit transmits the third PAM-N signal.

It should be noted that, the second PAM-N signal is a signal that originally needs to be transmitted by the communication device. If the transmitting unit directly transmits the second PAM-N signal, the second PAM-N signal transmitted by the transmitting unit is distorted due to impact of the transmitting unit, and an eye pattern of the second PAM-N signal transmitted by the transmitting unit is tilted. If the equalizer is used to perform anti-distortion preprocessing on the second PAM-N signal to obtain the third PAM-N signal, the third PAM-N signal is distorted relative to the second PAM-N signal, an eye pattern of the third PAM-N signal is also tilted, and a tilt direction of the eye pattern of the third PAM-N signal is opposite to a tilt direction of an eye pattern of a signal (for example, the first PAM-N signal) transmitted by the transmitting unit. In this case, if the transmitting unit transmits the third PAM-N signal, because the tilt direction of the eye pattern of the third PAM-N signal is opposite to the tilt direction of the eye pattern of the signal transmitted by the transmitting unit, the third PAM-N signal transmitted by the transmitting unit is distorted into the second PAM-N signal, and the eye pattern of the third PAM-N signal transmitted by the transmitting unit is not tilted.

Figure 10:
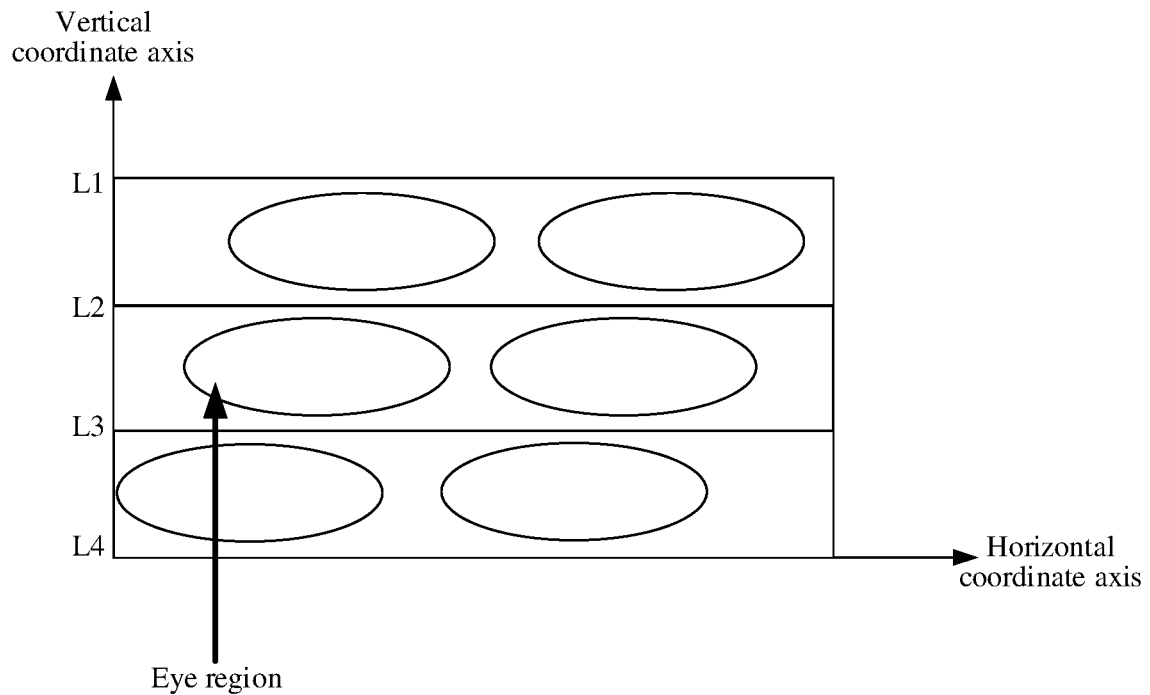
FIG. 10 is a schematic diagram of an eye pattern of a third PAM-4 signal according to an embodiment.
Figure 11:
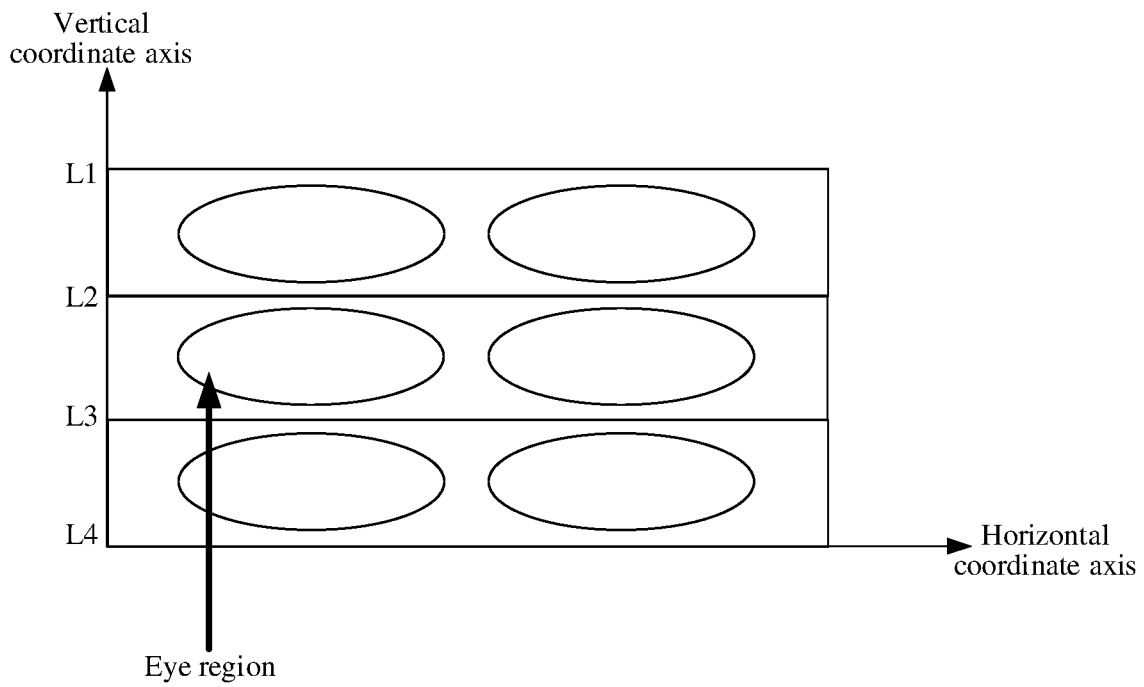
FIG. 11 is a schematic diagram of an eye pattern of a third PAM-4 signal transmitted by a transmitting unit according to an embodiment.

For example, when N=4, it is assumed that a schematic diagram of an eye pattern of a second PAM-4 signal directly transmitted by the transmitting unit is also shown in FIG. 7. In the eye pattern, each UI includes three eye regions, and the three eye regions are tilted leftwards. In this case, a schematic diagram of an eye pattern of a third PAM-4 signal processed and obtained by the processing unit using the equalizer may be shown in FIG. 10. In the eye pattern, each UI includes three eye regions, and the three eye regions are tilted rightward (opposite to the tilt direction of the eye region in FIG. 7). A schematic diagram of an eye pattern of a third PAM-4 signal transmitted by the transmitting unit is shown in FIG. 11. In the eye pattern, each UI includes three eye regions, the three eye regions are sequentially arranged in a vertical coordinate direction of the eye pattern, and the three eye regions are not tilted.

When the transmitting unit transmits a signal, the transmitted signal may be distorted due to impact of the transmitting unit. As a result, an eye pattern of the signal transmitted by the transmitting unit is tilted. In this embodiment, the distortion parameter of the eye pattern of the first PAM-N signal is obtained based on the impact of the transmitting unit on the signal. Then, anti-distortion preprocessing is performed, using the equalizer based on the distortion parameter, on the to-be-transmitted second PAM-N signal, to obtain the third PAM-N signal. Distortion of the third PAM-N signal relative to the second PAM-N signal can offset distortion of the second PAM-N signal transmitted by the transmitting unit. Therefore, the third PAM-N signal transmitted by the transmitting unit can be the same as the original second PAM-N signal, in other words, the third PAM-N signal that is distorted due to impact of the transmitting unit is the same as the original second PAM-N signal. In this way, a problem of a tilted eye pattern of the signal transmitted by the transmitting unit is avoided, and a bit error rate of the signal transmitted by the transmitting unit is reduced, so that the signal can meet a conformance test index, and effective communication between communication devices is ensured.

According to a test, when the second PAM-N signal has a speed of 100 gigabits per second, and the transmitting unit includes a DML, if the transmitting unit directly transmits the second PAM-N signal, a TDECQ index (a conformance index) of the second PAM-N signal is 5.2 decibels, quality of the second PAM-N signal is poor, and the bit error rate is high. If the transmitting unit transmits the third PAM-N signal obtained by performing anti-distortion preprocessing on the second PAM-N signal, a TDECQ index of the third PAM-N signal is optimized to 3.6 decibels, quality of the third PAM-N signal is good, and the bit error rate is low.

Optionally, in step 103, the processing unit may first determine the eye pattern of the first PAM-N signal, and then determine the distortion parameter of the eye pattern. Before determining the distortion parameter of the eye pattern, the processing unit may further store the eye pattern of the first PAM-N signal (for example, store the eye pattern in a data storage unit (for example, a memory)). Then, the processing unit may perform binarization processing on the eye pattern, to set a value of a pixel in the eye region in the eye pattern to 1 and set a value of a pixel outside the eye region in the eye pattern to 0. After performing the foregoing processing on the eye pattern, the processing unit may determine the distortion parameter based on the processed eye pattern.

The distortion parameter in the embodiment shown in FIG. 6 is the distortion parameter determined by the processing unit of the first device based on the eye pattern of the first PAM-N signal received by the receiving unit. Optionally, the distortion parameter may alternatively be transmitted by a second device connected to the first device.

Figure 12:
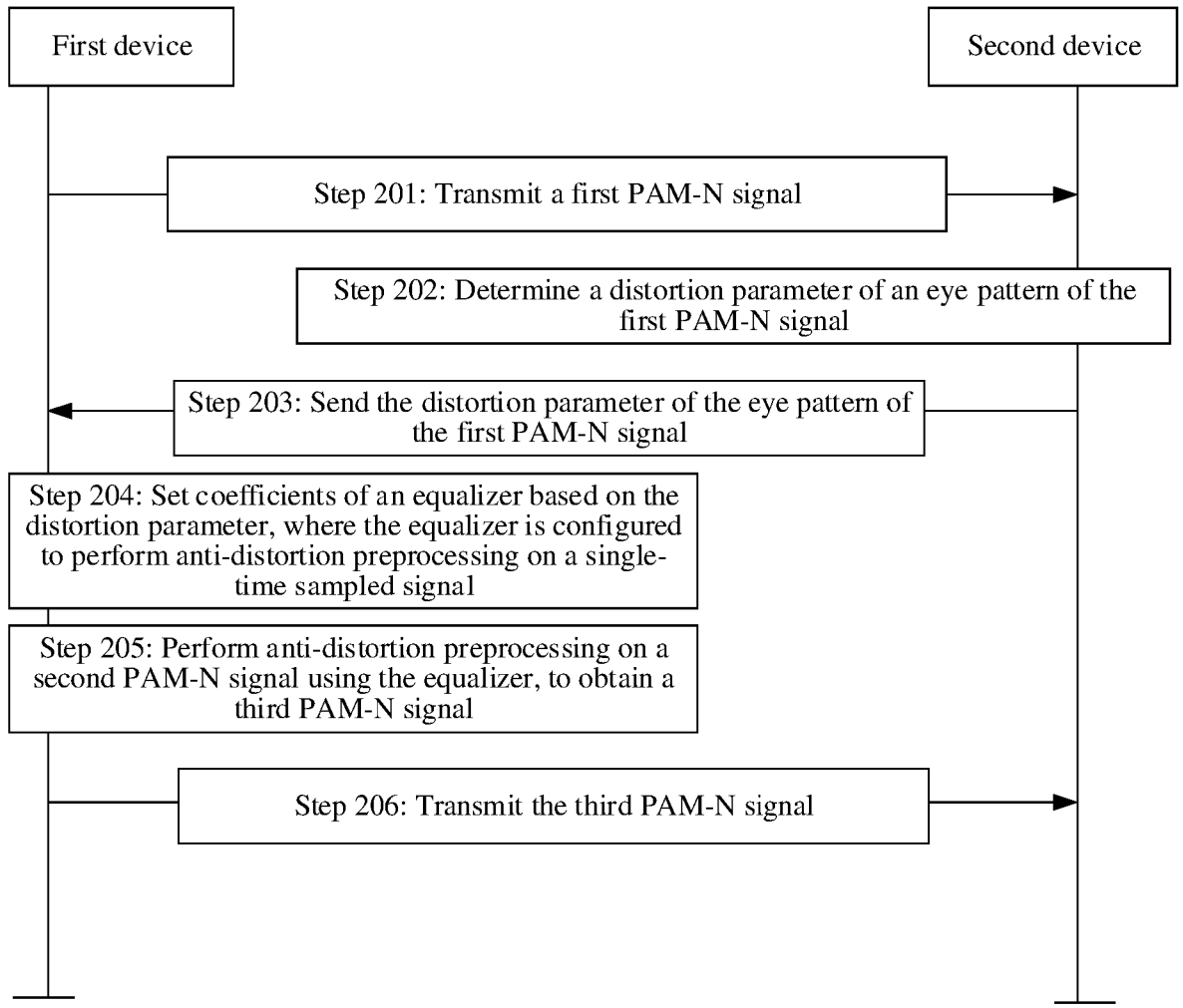
FIG. 12 is a flowchart of another signal processing method according to an embodiment.

For example, FIG. 12 is a flowchart of another signal processing method according to an embodiment. The signal processing method may be applied to a first device and a second device in a communication system provided in this embodiment. The first device and the second device are any two communication devices connected to each other in the communication system. As shown in FIG. 12, the signal processing method may include:

Step 201: A first device transmits a first PAM-N signal to a second device.

For example, the first device may transmit the first PAM-N signal using a transmitting unit in the first device. For a schematic diagram of a structure of the second device, refer to FIG. 2. The second device may receive the first PAM-N signal using a receiving unit in the second device.

Step 202: The second device determines a distortion parameter of an eye pattern of the first PAM-N signal.

The second device may obtain, using a processing unit in the second device, the first PAM-N signal received by the receiving unit, and determine the distortion parameter of the eye pattern of the first PAM-N signal.

For a process in which the processing unit in the second device determines the distortion parameter of the eye pattern of the first PAM-N signal, refer to step 103. Details are not described herein again in this embodiment.

Step 203: The second device sends the distortion parameter of the eye pattern of the first PAM-N signal to the first device.

After obtaining the distortion parameter of the eye pattern of the first PAM-N signal, the second device may transmit the distortion parameter to the first device through a backhaul path, so that the first device performs step 204 and step 205 based on the distortion parameter.

For example, the processing unit of the second device may transmit the distortion parameter to the transmitting unit, so that the transmitting unit transmits the distortion parameter to the first device. The first device may receive the distortion parameter using a receiving unit of the first device.

Step 204: The first device sets coefficients of an equalizer based on the distortion parameter, where the equalizer is configured to perform anti-distortion preprocessing on a single-time sampled signal.

For step 204, refer to step 104. Details are not described herein again in this embodiment.

Step 205: The first device performs anti-distortion preprocessing on the to-be-transmitted second PAM-N signal using the equalizer, to obtain a third PAM-N signal.

For step 205, refer to step 105 to step 107. Details are not described herein again in this embodiment.

Step 206: The first device transmits the third PAM-N signal to the second device.

For step 205, refer to step 108 and step 109. Details are not described herein again in this embodiment.

Optionally, in embodiments shown in FIG. 6 and FIG. 12, before setting the coefficients of the equalizer based on the distortion parameter, the first device may further determine whether the distortion parameter meets a target condition. When the distortion parameter meets the target condition, it indicates that quality of the signal transmitted by the transmitting unit of the first device is poor, and the first device sets the coefficients of the equalizer based on the distortion parameter and performs anti-distortion preprocessing on the second PAM-N signal using the equalizer. When the distortion parameter does not meet the target condition, it indicates that the quality of the signal transmitted by the transmitting unit of the first device is good, so that the first device does not need to set the coefficients of the equalizer based on the distortion parameter and perform anti-distortion preprocessing on the second PAM-N signal using the equalizer.

For example, an implementation of the distortion parameter is related to the target condition. When the implementation of the distortion parameter is adjusted, the target condition may also be adjusted correspondingly.

Assuming that the distortion parameter includes: in a horizontal coordinate direction of the eye pattern, a distance between a center of each second eye region and a center of a first eye region, the target condition may include: At least one distance in the distortion parameter is greater than a distance threshold. For example, as shown in FIG. 7, the distortion parameter includes: a distance h1 and a distance h3. When the distance h1 is greater than the distance threshold and the distance h3 is less than the distance threshold, or when the distance h1 is less than the distance threshold and the distance h3 is greater than the distance threshold, it may be determined that the distortion parameter meets the target condition.

Assuming that the distortion parameter includes: an included angle between a horizontal coordinate axis or a vertical coordinate axis of the eye pattern and a straight line on which the center of each second eye region and the center of the first eye region are located, the target condition may include: At least one included angle in the distortion parameter is greater than an included angle threshold. For example, as shown in FIG. 7, the distortion parameter includes: an included angle A1 and an included angle A3. When the included angle A1 is greater than the included angle threshold and the included angle A3 is less than the included angle threshold, or when the included angle A1 is less than the included angle threshold and the included angle A3 is greater than the included angle threshold, it may be determined that the distortion parameter meets the target condition.

In the related art, a communication device that receives a PAM-N signal may first decompose the PAM-N signal into signals of N levels, then perform multi-time sampling on the PAM-N signal, and process the PAM-N signal using an equalizer configured to process a multi-time sampled signal, to avoid a problem caused by eye pattern distortion of the PAM-N signal.

However, the PAM-N signal transmitted by the communication device still has the problem of the eye pattern distortion, and quality of the PAM-N signal is still poor, and a network access indicator still cannot be met. In addition, in this solution, the communication device that receives the PAM-N signal needs to perform multi-time sampling on the PAM-N signal, resulting in high power consumption of the communication device that receives the PAM-N signal. In addition, when the communication device that receives the PAM-N signal performs multi-time sampling on the PAM-N signal, it means that a DAC in the communication device that receives the PAM-N signal also needs to perform multi-time sampling on the signal, resulting in high power consumption of the DAC. When the PAM-N signal is a high-speed (for example, a speed of 100 gigabits per second, 200 gigabits per second, or 400 gigabits per second) signal, it is difficult for the DAC to implement multi-time sampling on the high-speed signal.

However, in this embodiment, because the digital-to-analog converter may perform single-time sampling on the initial signal, power consumption of the digital-to-analog converter is low. In addition, the processing unit processes the second PAM-N signal using the equalizer that processes a single-time sampled signal. Because the equalizer is not configured to process a multi-time sampled signal, power consumption of the processing unit is also low. In addition, when the initial signal is a high-speed signal, the digital-to-analog converter can support single-time sampling on the high-speed signal. In this way, distortion correction for the high-speed signal can be implemented in this embodiment. The signal processing method provided in this embodiment may be applied to a communication system of a high-speed (for example, a speed of 100 gigabits per second, 200 gigabits per second, or 400 gigabits per second) signal.

The first device provided in this embodiment is a communication device. For the signal processing method provided in the foregoing embodiments that, the communication device may include a transmitting unit and a processing unit.

The transmitting unit is configured to transmit a first pulse amplitude modulation PAM-N signal, and N≥2.

The processing unit is configured to: determine a distortion parameter of an eye pattern of the first PAM-N signal, where the distortion parameter is for reflecting a tilt status of the eye pattern; set coefficients of an equalizer based on the distortion parameter, where the equalizer is configured to perform anti-distortion preprocessing on a single-time sampled signal; perform, using the equalizer, anti-distortion preprocessing on a second PAM-N signal to be transmitted by the transmitting unit, to obtain a third PAM-N signal; and control the transmitting unit to transmit the third PAM-N signal.

The transmitting unit is further configured to transmit the third PAM-N signal.

Optionally, the communication device further includes a digital-to-analog converter, and the digital-to-analog converter is configured to perform single-time sampling on an initial signal to obtain the second PAM-N signal.

Optionally, N>2, each bit UI of the eye pattern includes N−1 eye regions, and the distortion parameter is for reflecting relative positions of the N−1 eye regions.

Optionally, the N−1 eye regions include a first eye region and N−2 second eye regions, and the first eye region is any eye region of the N−1 eye regions; and the distortion parameter includes: in a horizontal coordinate direction of the eye pattern, a distance between a center of each of the second eye regions and a center of the first eye region.

Optionally, the second PAM-N signal has N levels, the coefficients of the equalizer include N groups of coefficients that are in a one-to-one correspondence with the N levels, and a group of coefficients corresponding to an $i^{th}$ level in the N levels that are arranged in descending order include: $(a_i, 1, -a_i)$. When $i<x$, $a_i=h_i$; when $i=x$, $a_i=h_{i-1}/y$; when $i=x+1$, $a_i=h_i/y$; and when $i>x+1$, $a_i=h_{i-1}$. $1 \leq i \leq N$, $1 \leq x \leq N-1$, $y>1$. The N−1 eye regions are in a one-to-one correspondence with first N−1 levels in the N levels that are arranged in descending order, and in a vertical coordinate direction of the eye pattern, an eye region corresponding to the $i^{th}$ level is located between the $i^{th}$ level and an $(i+1)^{th}$ level; an eye region corresponding to an $x^{th}$ level in the N levels that are arranged in descending order is the first eye region; and $h_i$ is a distance between a center of the eye region corresponding to the $i^{th}$ level and a center of the eye region corresponding to the $x^{th}$ level in the horizontal coordinate direction.

Optionally, y=2 or 3.

Optionally, the N−1 eye regions include a first eye region and N−2 second eye regions, and the first eye region is any eye region of the N−1 eye regions; and the distortion parameter includes: an included angle between a horizontal coordinate axis or a vertical coordinate axis of the eye pattern and a straight line on which a center of each of the second eye regions and a center of the first eye region are located.

Optionally, when N is an odd number, the first eye region is a $((N+1)/2)^{th}$ eye region in a target direction in the N−1 eye regions; or when N is an even number, the first eye region is a $(N/2)^{th}$ eye region in a target direction in the N−1 eye regions. The target direction is the vertical coordinate direction of the eye pattern, or an opposite direction of the vertical coordinate direction.

Optionally, the processing unit is configured to, before setting the coefficients of the equalizer based on the distortion parameter, determine that the distortion parameter meets a target condition.

Optionally, the communication device further includes a receiving unit. The receiving unit is configured to, when connected to the transmitting unit, receive the first PAM-N signal transmitted by the transmitting unit. The processing unit is further configured to obtain the first PAM-N signal received by the receiving unit.

Optionally, the communication device further includes the receiving unit. The transmitting unit is configured to transmit the first PAM-N signal to a second device. The receiving unit is configured to receive the distortion parameter transmitted by the second device. The processing unit is configured to obtain the distortion parameter received by the receiving unit.

Figure 13:
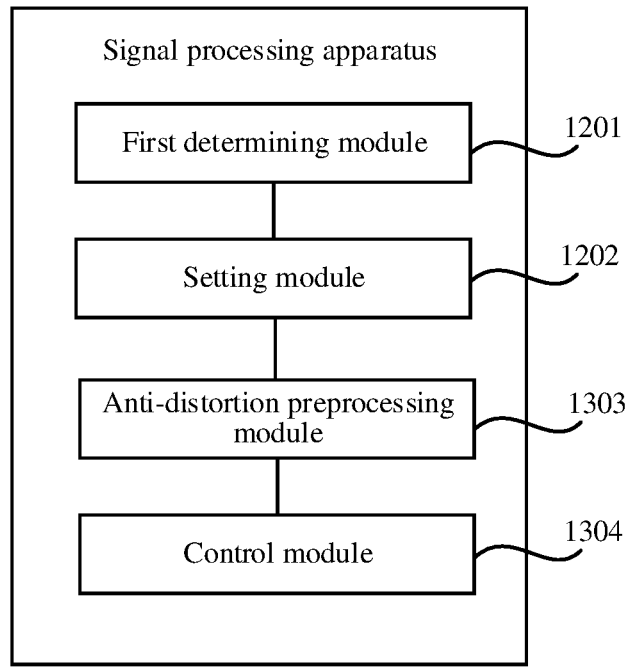
FIG. 13 is a block diagram of a signal processing apparatus according to an embodiment.

FIG. 13 is a block diagram of a signal processing apparatus according to an embodiment. The signal processing apparatus may be, for example, the processing unit in the first device in the foregoing embodiments. As shown in FIG. 13, the signal processing apparatus includes:

- a first determining module 1301, configured to determine a distortion parameter of an eye pattern of a first pulse amplitude modulation PAM-N signal transmitted by a transmitting unit in a first device, where the distortion parameter is for reflecting a tilt status of the eye pattern, and N≥2;
- a setting module 1302, configured to set coefficients of an equalizer based on the distortion parameter, where the equalizer is configured to perform anti-distortion preprocessing on a single-time sampled signal;
- an anti-distortion preprocessing module 1303, configured to perform, using the equalizer, anti-distortion preprocessing on a second PAM-N signal to be transmitted by the transmitting unit, to obtain a third PAM-N signal, where the second PAM-N signal is a single-time sampled signal; and
- a control module 1304, configured to control the transmitting unit to transmit the third PAM-N signal.

Optionally, the first device includes a digital-to-analog converter, and the digital-to-analog converter is configured to perform single-time sampling on an initial signal, to obtain the second PAM-N signal. The signal processing apparatus further includes a first obtaining module (not shown in FIG. 13), configured to, before the equalizer is used to perform anti-distortion preprocessing on the second PAM-N signal to be transmitted by the transmitting unit, obtain the second PAM-N signal obtained by the digital-to-analog converter.

Optionally, N>2, each bit UI of the eye pattern includes N−1 eye regions, and the distortion parameter is for reflecting relative positions of the N−1 eye regions.

Optionally, the N−1 eye regions include a first eye region and N−2 second eye regions, and the first eye region is any eye region of the N−1 eye regions; and the distortion parameter includes: in a horizontal coordinate direction of the eye pattern, a distance between a center of each of the second eye regions and a center of the first eye region.

Optionally, the second PAM-N signal has N levels, the coefficients of the equalizer include N groups of coefficients that are in a one-to-one correspondence with the N levels, and a group of coefficients corresponding to an $i^{th}$ level in the N levels that are arranged in descending order include: ($a_i$, 1, $-a_i$). When i<x, $a_i=h_i$; when i=x, $a_i=h_{i-1}/y$; when i=x+1, $a_i=h_i/y$; and when i>x+1, $a_i=h_{i-1}$. 1≤i≤N, 1≤x≤N−1, y>1. The N−1 eye regions are in a one-to-one correspondence with first N−1 levels in the N levels that are arranged in descending order, and in a vertical coordinate direction of the eye pattern, an eye region corresponding to the $i^{th}$ level is located between the $i^{th}$ level and an $(i+1)^{th}$ level; an eye region corresponding to an $x^{th}$ level in the N levels that are arranged in descending order is the first eye region; and $h_i$ is a distance between a center of the eye region corresponding to the $i^{th}$ level and a center of the eye region corresponding to the $x^{th}$ level in the horizontal coordinate direction.

Optionally, y=2 or 3.

Optionally, the N−1 eye regions include a first eye region and N−2 second eye regions, and the first eye region is any eye region of the N−1 eye regions; and the distortion parameter includes: an included angle between a horizontal coordinate axis or a vertical coordinate axis of the eye pattern and a straight line on which a center of each of the second eye regions and a center of the first eye region are located.

Optionally, when N is an odd number, the first eye region is a $((N+1)/2)^{th}$ eye region in a target direction in the N−1 eye regions; or when N is an even number, the first eye region is a $(N/2)^{th}$ eye region in a target direction in the N−1 eye regions. The target direction is the vertical coordinate direction of the eye pattern, or an opposite direction of the vertical coordinate direction.

Optionally, the signal processing apparatus further includes a second determining module (not shown in FIG. 13), configured to, before the coefficients of the equalizer are set based on the distortion parameter, determine that the distortion parameter meets a target condition.

Optionally, the first device includes a receiving unit, and the signal processing apparatus further includes a second obtaining module (not shown in FIG. 13), configured to, when the transmitting unit is connected to the receiving unit, obtain the first PAM-N signal that is transmitted by the transmitting unit and received by the receiving unit.

Optionally, the first device includes the receiving unit, and the first determining module is configured to, using the receiving unit, receive the distortion parameter sent by a second device, where the first PAM-N signal is a signal transmitted by the transmitting unit to the second device.

Figure 14:
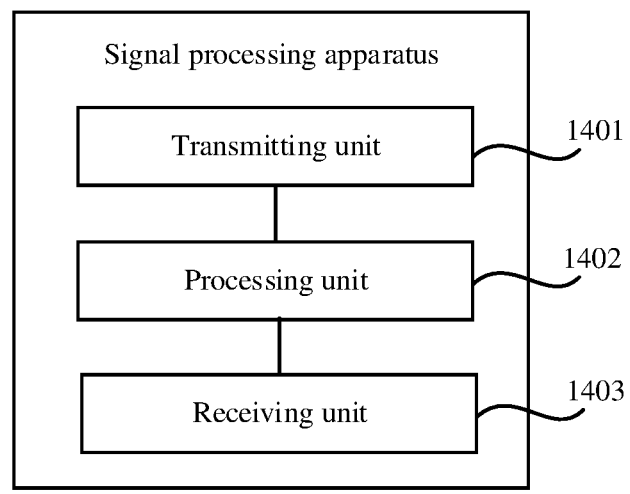
FIG. 14 is a block diagram of another signal processing apparatus according to an embodiment.

FIG. 14 is a block diagram of another signal processing apparatus according to an embodiment. The signal processing apparatus may be, for example, the second device in the embodiment shown in FIG. 11. As shown in FIG. 14, the signal processing apparatus includes a transmitting unit 1401, a receiving unit 1402, and a processing unit 1403.

The receiving unit 1402 is configured to receive a first pulse amplitude modulation PAM-N signal transmitted by a first device.

The processing unit 1403 is configured to determine a distortion parameter of an eye pattern of the first PAM-N signal.

The transmitting unit 1401 is configured to transmit the distortion parameter to the first device, so that the first device processes a to-be-transmitted signal based on the distortion parameter.

An embodiment may provide a communication system. The communication system may include a plurality of communication devices. Any communication device of the plurality of communication devices is any first device provided in the embodiments. For functions of the first device, refer to corresponding functions described in the foregoing embodiments. Details are not described herein again in this embodiment of this application.

Optionally, the plurality of communication devices may further include any second device provided in the embodiments. For functions of the second device, refer to corresponding functions described in the foregoing embodiments. Details are not described herein again in this embodiment.

An embodiment may provide a chip. The chip may include a programmable logic circuit and/or program instructions, and when run, the chip is configured to implement actions performed by the processing unit of the first device in the signal processing method provided in the embodiments.

An embodiment may provide a non-transitory computer-readable storage medium. The non-transitory computer-readable storage medium stores instructions, and when the instructions are run on a computer, the computer is enabled to perform actions performed by the processing unit of the first device in the signal processing method provided in the embodiments or the computer is enabled to perform actions performed by the second device in the signal processing method provided in the embodiments.

An embodiment may provide a computer program product including instructions. When the computer program product is run on a computer, the computer is enabled to perform actions performed by the processing unit of the first device in the signal processing method provided in the embodiments or the computer is enabled to perform actions performed by the second device in the signal processing method provided in the embodiments.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, all or some of the procedures or functions according to embodiments are generated. The computer may be a general-purpose computer, a computer network, or another programmable apparatus. The computer instructions may be stored in a non-transitory computer-readable storage medium. The non-transitory computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

The terms "first", "second", and the like are merely intended for description, but cannot be understood as an indication or implication of relative importance. The term "at least one" refers to one or more, and the term "a plurality of" refers to two or more, unless expressly limited otherwise.

For different types of embodiments such as the method embodiment and the apparatus embodiment provided in the embodiments, refer to each other. This is not limited in the embodiments. A sequence of the operations of the method embodiment can be properly adjusted, and the operations can be correspondingly added or deleted based on a situation. Any method that can be easily figured out by a person skilled in the art shall fall within the scope of the embodiments. Therefore, details are not described again.

In the corresponding embodiments, it should be understood that the system, device, and apparatus may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts described as units may or may not be physical units, may be located in one position, or may be distributed on a plurality of devices. Some or all of the units may be selected based on actual requirements to achieve the objectives of the solutions of embodiments.

The foregoing descriptions are merely embodiments but are not intended to limit the scope of the embodiments. Any modification or replacement readily figured out by a person skilled in the art shall fall within the scope of the embodiments.

What is claimed is:

1. A signal processing method, comprising:
    determining a distortion parameter of an eye pattern of a first pulse amplitude modulation (PAM)-N signal transmitted by a transmitting unit in a first device, wherein the distortion parameter is for reflecting a tilt status of the eye pattern, and $N \geq 2$;
    setting coefficients of an equalizer based on the distortion parameter, wherein the equalizer is configured to perform anti-distortion preprocessing on a sampled signal;
    performing, using the equalizer, anti-distortion preprocessing on a second PAM-N signal, to obtain a third PAM-N signal; and
    controlling the transmitting unit to transmit the third PAM-N signal;
    wherein $N \geq 2$, each bit UI of the eye pattern comprises N−1 eye regions, and the distortion parameter is for reflecting relative positions of the N−1 eye regions;
    the N−1 eye regions comprise a first eye region and N−2 second eye regions, and the first eye region is any eye region of the N−1 eye regions; and
    the distortion parameter comprises: an included angle between a horizontal coordinate axis or a vertical coordinate axis of the eye pattern and a straight line on which a center of each of the second eye regions and a center of the first eye region are located.

2. The signal processing method according to claim 1, wherein the first device comprises a digital-to-analog converter, and the digital-to-analog converter is configured to perform sampling on an initial signal, to obtain the second PAM-N signal; and
    before performing, using the equalizer, the anti-distortion preprocessing on the second PAM-N signal to be transmitted by the transmitting unit, the method further comprises:
    obtaining the second PAM-N signal obtained by the digital-to-analog converter.

3. The signal processing method according to claim 1, wherein the N−1 eye regions comprise a first eye region and N−2 second eye regions, and the first eye region is any eye region of the N−1 eye regions; and
    the distortion parameter comprises: in a horizontal coordinate direction of the eye pattern, a distance between a center of each of the second eye regions and a center of the first eye region.

4. The signal processing method according to claim 3, wherein the second PAM-N signal has N levels, the coefficients of the equalizer comprise N groups of coefficients that are in a one-to-one correspondence with the N levels, and a group of coefficients corresponding to an $i^{th}$ level in the N levels that are arranged in descending order comprise: $(a_i, 1, -a_i)$;
    when $i<x$, $a_i=h_i$;
    when $i=x$, $a_i=h_{i-1}/y$;
    when $i=x+1$, $a_i=h_i/y$; and
    when $i>x+1$, $a_i=h_{i-1}$, wherein
    $1 \leq i \leq N$, $1 \leq x \leq N-1$, $y>1$, the N−1 eye regions are in a one-to-one correspondence with first N−1 levels in the N levels that are arranged in descending order, and in a vertical coordinate direction of the eye pattern, an eye region corresponding to the $i^{th}$ level is located between the $i^{th}$ level and an $(i+1)^{th}$ level; an eye region corresponding to an $x^{th}$ level in the N levels that are arranged in descending order is the first eye region; and hi is a distance between a center of the eye region corresponding to the $i^{th}$ level and a center of the eye region corresponding to the $x^{th}$ level in the horizontal coordinate direction.

5. The signal processing method according to claim 4, wherein y=2 or 3.

6. The signal processing method according to claim 3, wherein
when N is an odd number, the first eye region is a $((N+1)/2)^{th}$ eye region in a target direction in the N−1 eye regions; or
when N is an even number, the first eye region is a $(N/2)^{th}$ eye region in a target direction in the N−1 eye regions; and
the target direction is the vertical coordinate direction of the eye pattern, or an opposite direction of the vertical coordinate direction.

7. The signal processing method according to claim 1, wherein the setting coefficients of the equalizer based on the distortion parameter, the method further comprises:
determining that the distortion parameter meets a target condition.

8. The signal processing method according to claim 1, wherein the first device comprises a receiving unit, and the method further comprises:
when the transmitting unit is connected to the receiving unit, obtaining the first PAM-N signal that is transmitted by the transmitting unit and received by the receiving unit.

9. The signal processing method according to claim 1, wherein the first device comprises the receiving unit, and determining the distortion parameter of the eye pattern of the first PAM-N signal transmitted by the transmitting unit in the first device further comprises:
receiving, using the receiving unit, the distortion parameter sent by a second device, wherein the first PAM-N signal is a signal transmitted by the transmitting unit to the second device.

10. A signal processing method, comprising:
receiving a first pulse amplitude modulation (PAM)-N signal transmitted by a first device;
determining a distortion parameter of an eye pattern of the first PAM-N signal; and
sending the distortion parameter to the first device, so that the first device processes a to-be-transmitted signal based on the distortion parameter;
wherein N>2, each bit UI of the eye pattern comprises N−1 eye regions, and the distortion parameter is for reflecting relative positions of the N−1 eye regions;
the N−1 eye regions comprise a first eye region and N−2 second eye regions, and the first eye region is any eye region of the N−1 eye regions; and
the distortion parameter comprises: an included angle between a horizontal coordinate axis or a vertical coordinate axis of the eye pattern and a straight line on which a center of each of the second eye regions and a center of the first eye region are located.

11. A communication device, wherein the communication device comprises a transmitting unit and a processing unit, wherein
the transmitting unit is configured to transmit a first pulse amplitude modulation (PAM)-N signal, and N≥2;
the processing unit is configured to:
determine a distortion parameter of an eye pattern of the first PAM-N signal, wherein the distortion parameter is for reflecting a tilt status of the eye pattern;
set coefficients of an equalizer based on the distortion parameter, wherein the equalizer is configured to perform anti-distortion preprocessing on a sampled signal;
perform, using the equalizer, anti-distortion preprocessing on a second PAM-N signal, to obtain a third PAM-N signal; and
control the transmitting unit to transmit the third PAM-N signal; and
the transmitting unit is further configured to transmit the third PAM-N signal;
wherein N≥2, each bit UI of the eye pattern comprises N−1 eye regions, and the distortion parameter is for reflecting relative positions of the N−1 eye regions;
the N−1 eye regions comprise a first eye region and N−2 second eye regions, and the first eye region is any eye region of the N−1 eye regions; and
the distortion parameter comprises: an included angle between a horizontal coordinate axis or a vertical coordinate axis of the eye pattern and a straight line on which a center of each of the second eye regions and a center of the first eye region are located.

12. The communication device according to claim 11, wherein the communication device further comprises a digital-to-analog converter configured to perform sampling on an initial signal to obtain the second PAM-N signal.

13. The communication device according to claim 11, wherein the N−1 eye regions comprise a first eye region and N−2 second eye regions, and the first eye region is any eye region of the N−1 eye regions; and
the distortion parameter comprises: in a horizontal coordinate direction of the eye pattern, a distance between a center of each of the second eye regions and a center of the first eye region.

14. The communication device according to claim 13, wherein the second PAM-N signal has N levels, the coefficients of the equalizer comprise N groups of coefficients that are in a one-to-one correspondence with the N levels, and a group of coefficients corresponding to an $i^{th}$ level in the N levels that are arranged in descending order comprise: ($a_i$, 1, −$a_i$);
when i<x, $a_i$=$h_i$;
when i=x, $a_i$=$h_{i-1}$/y;
when i=x+1, $a_i$=$h_i$/y; and
when i>x+1, $a_i$=$h_{i-1}$, wherein
1≤i≤N, 1≤x≤N−1, y>1, the N−1 eye regions are in a one-to-one correspondence with first N−1 levels in the N levels that are arranged in descending order, and in a vertical coordinate direction of the eye pattern, an eye region corresponding to the $i^{th}$ level is located between the $i^{th}$ level and an $(i+1)^{th}$ level; an eye region corresponding to an $x^{th}$ level in the N levels that are arranged in descending order is the first eye region; and hi is a distance between a center of the eye region corresponding to the $i^{th}$ level and a center of the eye region corresponding to the $x^{th}$ level in the horizontal coordinate direction.

15. The communication device according to claim 13, wherein when N is an odd number, the first eye region is a $((N+1)/2)^{th}$ eye region in a target direction in the N−1 eye regions; or when N is an even number, the first eye region is a $(N/2)^{th}$ eye region in a target direction in the N−1 eye regions; and
the target direction is the vertical coordinate direction of the eye pattern, or an opposite direction of the vertical coordinate direction.

16. The communication device according to claim 11, wherein the communication device further comprises a receiving unit;
   the transmitting unit is configured to transmit the first PAM-N signal to a second device;
   the receiving unit is configured to receive the distortion parameter transmitted by the second device; and
   the processing unit is configured to obtain the distortion parameter received by the receiving unit.

* * * * *